Patented Dec. 23, 1924.

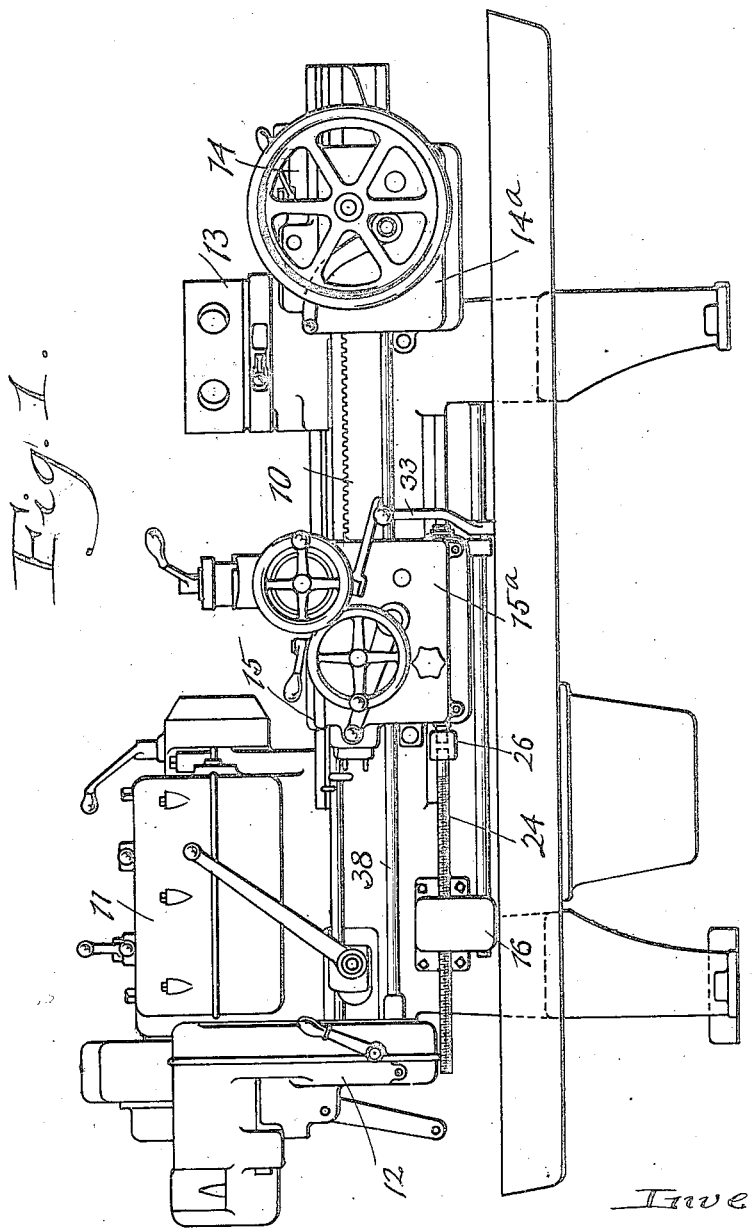

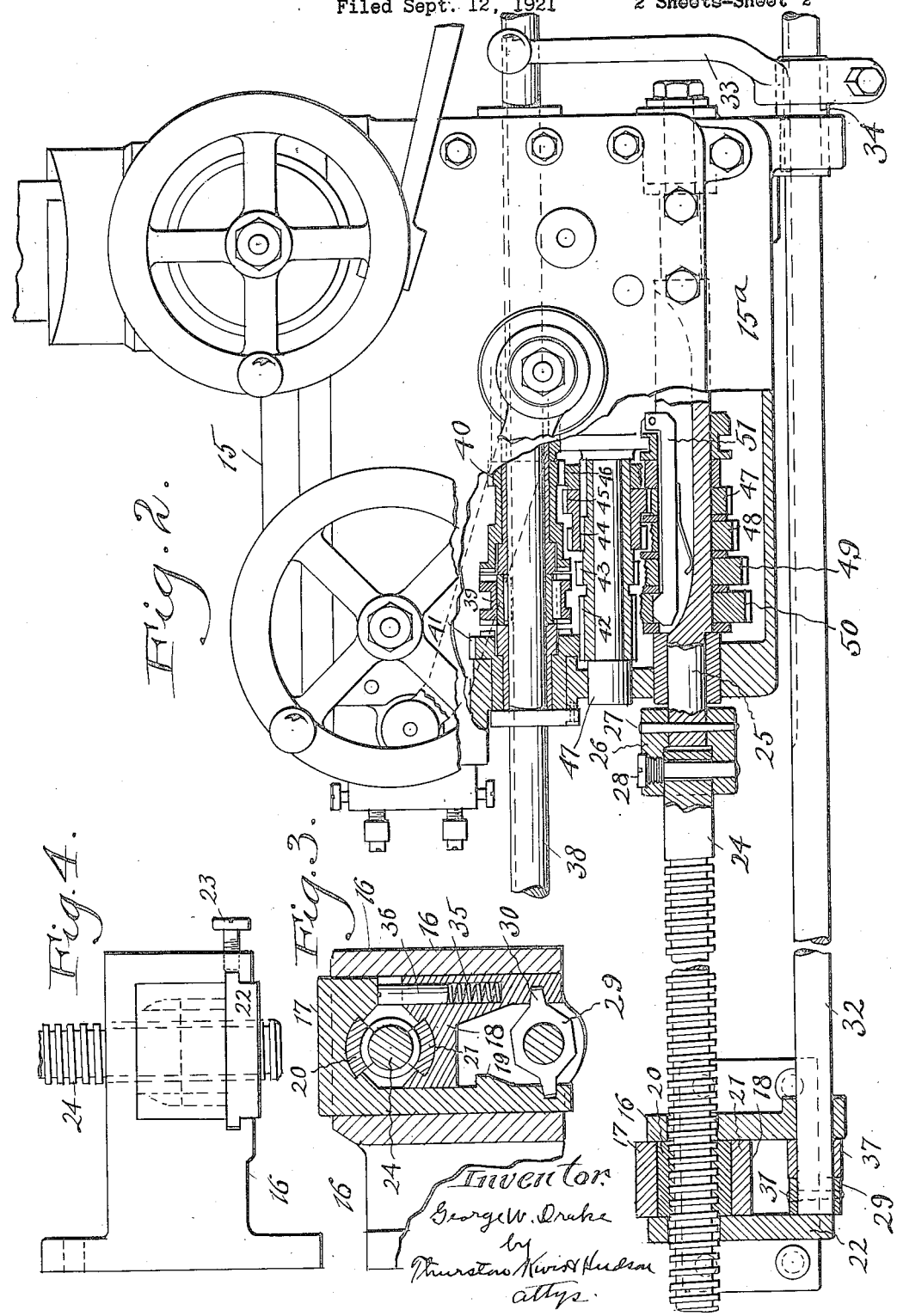

UNITED STATES PATENT OFFICE.

GEORGE W. DRAKE, OF CLEVELAND HEIGHTS, OHIO, ASSIGNOR TO THE WARNER & SWASEY COMPANY, OF CLEVELAND, OHIO, A CORPORATION OF OHIO.

THREAD-CHASING ATTACHMENT FOR LATHES.

Application filed September 12, 1921. Serial No. 499,948.

*To all whom it may concern:*

Be it known that I, GEORGE W. DRAKE, a citizen of the United States, residing at Cleveland Heights, in the county of Cuyahoga and State of Ohio, have invented a certain new and useful Improvement in Thread-Chasing Attachments for Lathes, of which the following is a full, clear, and exact description.

This invention relates to a thread chasing attachment for lathes.

It has been customary heretofore, and in fact, standard practice, to have the thread cutting attachment carried by the carriage apron. This arrangement while satisfactory in some respects, has certain disadvantages, among which might be mentioned the fact that where a number of short leaders or screws with followers are used the length of thread and location of same on the work are limited, and where a long screw with change gears are used, the construction is expensive.

In accordance with the present invention, the thread chasing attachment in so far as the follower is concerned, is wholly independent of the carriage apron and is stationarily mounted on the bed of the machine. Furthermore, the threaded shaft or leader, as well as the follower are wholly outside of the apron, thus making it possible to readily change any given follower and leader with a follower and leader of a different thread pitch should it be desired to cut threads having a pitch other than might be obtained by simply changing the speed ratio of the driving gears, and this arrangement also allows the use of a leader of any desired length within limits, and has other desirable features which need not here be enumerated.

The invention may be briefly summarized as consisting in certain novel combinations and arrangements of parts and details of construction which will be described in the specification and set forth in the appended claims.

In the accompanying sheets of drawings showing an embodiment of the invention which operates with high efficiency, Fig. 1 is a side view of a lathe equipped with the invention; Fig. 2 is an enlarged view of the carriage apron with parts in section, showing the thread chasing attachment; Fig. 3 is a transverse sectional view through that part of the attachment which is mounted on the bed of the lathe and showing the manner in which the nut sections or follower are shifted into and out of engagement with the leader; and Fig. 4 is a top plan view of the same.

Referring now to the drawings, 10 represents the bed of the lathe, 11 the head and 12 the speed change box adjacent the head. We have in this instance shown a turret lathe, but obviously the invention is not limited to a lathe of this type. The turret 13 is here shown mounted on a saddle 14, having the usual apron 14ª. The details of the parts so far referred to, constitute no part of the present invention and may be varied as desired.

Guided on ways of the bed in the usual manner, is a carriage 15, a portion only of which need be shown, as the carriage also, with its cross-head may assume any form. The carriage apron is shown at 15ª, the external movement controlling parts of which need not be described as they likewise, except for the chaser controlling lever, are not involved in the present invention.

Taking up now the attachment, the latter comprises a housing 16, which is bolted to the head end of the bed of the lathe to the left of the carriage as shown in Fig. 1. As shown in Fig. 3, this housing contains two jaws 17 and 18, slidable in opposite directions, and in this case vertically, the movement of the jaws away from each other being limited by a stop shoulder 19 carried by one of the jaws. The jaws are provided on their adjacent faces with two oppositely disposed threaded nut sections 20 and 21 which are removably secured to the jaws in any suitable manner, but in this instance are dove-tailed in the jaws, and are normally held in position by a slide or cover plate 22 on one side of the housing, which plate is held in place by a set screw 23, and when removed allows the nut sections to be slid endwise from the jaws and from the housing.

The nut sections 20 and 21 constitute the follower adapted to be moved into and out of engagement with a similarly threaded screw or leader 24 which projects through the housing between the nut sections 20 and 21 and is designed to be removably attached or coupled to a rotary drive shaft 25 in the carriage apron 15ª, this shaft 25 being a part or one element of standard mechanism carried by the apron for feeding the cross slide carriage lengthwise of the bed and for moving the cross slide of the carriage transversely of the bed. In this instance the shaft 25 which rotates the leader 24 is mounted in the lower part of the carriage apron and has its end to which the leader is coupled projecting from the left hand side of the apron so that the coupling will be wholly on the outside of the apron and therefore readily accessible. In this instance the coupling consists of a collar 26, which is secured by a pin 27 to the outer projecting end of the drive shaft 25, and by a screw 28 to the adjacent end of the leader 24.

For the purpose of shifting the nut sections 20 and 21 into operative engagement with the leader 24, I have provided in this instance between the lower and oppositely disposed legs of the jaws 17 and 18 a rocker 29 adapted to be turned in this case, back and forth through a portion of a revolution, this rocker having diametrically opposite tongues 30 which engage in slots in the opposite faces of the lower portions of the jaws 17 and 18. This rocker is secured by a pin 31 to an operating shaft 32 which extends horizontally beneath the carriage apron, the latter having at the right hand side thereof in convenient position to be shifted by the operator, an operating lever 33 which is preferably mounted on a bushing 34 carried by the apron and splined to the operating shaft 32, so that when the lever is rocked, the ensuing rotation or rocking movement imparted to the shaft 32 shifts the rocker so as to cause the nut sections 20 and 21 to engage or to be disengaged from the leader. Preferably the jaws are moved apart so as to disengage the nut sections from the leader by a spring 35 (see Fig. 3) seated in a socket of one of the jaws, and in this instance engaging a pin 36 which bears against the opposite jaw. This spring separates the jaws automatically when the operator releases the lever 33. At the side of the rocker 29 (see Fig. 2) there is a bushing 37 which with the rocker fills the space between the one side of the housing 16 and the removable slide or cover plate 22.

I will next describe the means herein illustrated by which power rotation at various speeds is furnished the leader by means of suitable gearing within the apron. It will be observed that from the speed change box 12 at the head end of the lathe is a shaft 38 which as is customary, transmits fast and slow speeds to the apron gearing. This shaft which projects through the carriage apron 15ª and through the apron 14ª as well, is provided inside the carriage apron 15ª with a slidable clutch member 39, (see Fig. 2) which clutches to the shaft either small driving gear 40, or the relatively large driving gear 41, these gears as well as the other gears to be next referred to, forming a part of the apron gearing. Either of the gears 40 and 41 is adapted to drive nest gears 42, 43, 44, 45 and 46, mounted on a shaft 47, and these gears in turn drive nest gears 47, 48, 49 and 50, which in turn drive shaft 25, which as previously described, is adapted to be coupled to the leader 24. A sliding key 51 forms driving engagement between the shaft 25 and any one of the nest gears 47 to 50 inclusive.

The gearing above described constitutes the standard apron gearing commonly employed for the purpose of shifting the cross slide carriage and for moving the cross slide on the carriage at a multiplicity of speeds. That is to say, the apron gearing as well as the shaft 25 constitutes standard equipment utilized for the above purposes but also for the operation of the leader 24.

It will be obvious without further description, that by the speed change gearing within the apron, as well as the speed change gearing within the gear box 12, the leader operating shaft 25 may be rotated at a multiplicity of speeds, making it possible to produce threads on the work having a pitch which may be the same as the pitch of the thread on the leader, or a variety of multiples of the pitch on the leader.

It will be seen therefore, that threads of a variety of different pitches can be cut on the work through the variable speed apron gearing, and that different follower nut sections and leaders may be utilized to obtain any thread pitches desired, the nut sections and leader being readily replaceable with another set having the desired thread pitch, inasmuch as the attachment is wholly outside of the apron and substantially independent thereof.

It will be seen, therefore, that the invention possesses numerous distinctive features which include the fact that the follower nut sections are stationary as far as longitudinal movement is concerned, and are mounted at the head end of the machine instead of in or on the carriage apron or carriage. Also that the leader and follower of the attachment are readily removable and can as readily be replaced with others having any desired thread pitch.

It will be apparent also, that the invention permits the use of a long leader, making it possible to cut a long thread or a short thread in any position on a long piece. Further, the movement of the carriage is not limited in any way by the chasing attachment. Finally, it might be mentioned that the follower being in the form of two nut sections, as shown, makes it possible to produce four nut sections, or two sets in one piece by sub-dividing the piece into four quarters. Thus the follower, and in fact, the entire chasing attachment can be produced inexpensively.

The terms "leader" and "follower" are used in this case for the sake of brevity, it being understood, of course, that the part herein termed the follower is stationary except for the engaging and disengaging movements thereof, and that the part herein termed the leader is the movable part which is mounted for rotary movement and movement longitudinally of the bed, this being the reverse of the situation that prevails with thread chasing attachments employed heretofore.

While I have shown the preferred construction, I do not desire to be confined to the precise details shown, nor to a lathe of the turret type, as this type of lathe is illustrated by way of example only, of one of the different types of lathes to which the invention is applicable, and I therefore aim in my claims to cover all modifications and adaptations of the invention which do not involve a departure from the spirit and scope of the invention as defined in the appended claims.

Having described my invention, I claim:

1. A lathe having a bed and a traveling carriage with its apron, and a thread chasing attachment comprising a rotary leader and a follower adapted to be moved into and out of engagement with the leader, one part being supported on the bed independently of the carriage and apron, and the other movable with the carriage and apron and adapted to be rotated by a part carried thereby.

2. A lathe comprising a bed having a carriage and attached apron, a thread chasing attachment comprising a follower supported independently of the carriage and apron, and a leader adapted to be engaged by the follower and to be rotated by the apron gearing.

3. A lathe comprising a bed having a carriage and attached apron, a thread chasing attachment comprising a follower stationarily supported independently of the carriage and apron, a leader adapted to be engaged by the follower and to be rotated by the apron gearing, and a controlling member movable with the apron for shifting the follower into engagement with the leader.

4. A lathe comprising a bed having a traveling carriage and a depending apron with a drive shaft, a thread chasing attachment comprising a follower supported independently of the apron, and a leader adapted to be engaged by the follower and connected to said drive shaft.

5. A lathe comprising a bed having a traveling carriage and a depending apron with a drive shaft, a thread chasing attachment comprising a follower supported independently of the apron, and a leader adapted to be engaged by the follower and removably coupled to said drive shaft at one side of the apron.

6. In combination with a lathe having a bed and a traveling carriage, a thread cutting attachment comprising a follower and a leader, one adapted to be secured to the bed and the other to be connected to the carriage and to be rotated by a part carried thereby, the follower comprising a housing having a pair of oppositely movable jaws each having a threaded section of a nut adapted to engage the leader.

7. In combination with a lathe having a bed and a carriage, a thread cutting attachment comprising a follower and a leader, one adapted to be secured to the bed independently of the carriage and the other to be connected to the carriage and to be rotated by a part carried thereby, said follower comprising a housing having a pair of oppositely movable jaws provided on their adjacent faces with threaded nut sections removably secured to the jaws.

8. In combination with a lathe having a bed and a carriage, a thread cutting attachment comprising a follower and a leader, one adapted to be secured to the bed independently of the carriage, and the other to be connected to the carriage so that it may be rotated by a part thereof, said follower comprising a housing having a pair of oppositely movable jaws provided with threaded nut sections adapted to engage the leader, and a rocker arranged between portions of the jaws and serving when rocked to move them in an opposite direction.

9. In combination with a lathe having a bed and a carriage, a thread cutting attachment comprising a follower and a leader, one adapted to be secured to the bed independently of the carriage, and the other to be rotated by a part carried by the carriage, said follower comprising a housing provided therein with two oppositely movable jaws, nut sections secured on the adjacent faces of the jaws, said housing having a movable section permitting the removal of the nut sections from the jaws and from the housing.

10. In combination with a lathe having a bed and a carriage, a thread cutting attachment comprising a follower and a leader, one adapted to be secured to the bed independently of the carriage, and the other to be rotated by a part carried by the carriage, said follower comprising a housing having a pair of oppositely movable jaws therein, provided on their adjacent faces with threaded nut sections, a spring for spreading the jaws, and a device for shifting the jaws so as to move the jaws and nut sections toward each other.

11. A lathe comprising a bed having a traveling carriage and its depending apron, multiple speed gearing and a shaft supported by the apron, a thread cutting attachment comprising a follower supported by the bed independently of the carriage and apron, a leader detachably connected to said apron shaft, and a control for the chaser attachment comprising a shaft extending along the bed and having a part for shifting the follower, and having an operating lever adjacent the apron and movable therewith.

12. A lathe having a bed, a traveling carriage and a depending apron, the carriage being provided with speed changing gears and a shaft, a thread cutting attachment comprising a housing secured to the bed and provided with a follower, a leader connected to said shaft and extending through the housing so that the follower may be moved into and out of engagement therewith, and a control shaft extending along the bed adjacent the apron, said control shaft being journaled in the housing and provided with a follower shifter member, and said apron having a control lever for rocking said control shaft.

13. In combination with a lathe having a bed and a traveling carriage, a thread cutting attachment comprising a follower and a leader, one adapted to be secured to the bed independently of the carriage, and the other to be rotated by a part carried by the carriage, said follower comprising a housing having a cover plate and forming therewith a sleeve-like member, a pair of opposite movable slides surrounded on all sides by said housing and cover plate, said slides being provided with threaded nut sections adapted to engage the leader.

14. A lathe comprising a bed having a traveling carriage and its depending apron, multiple speed gearing carried by said apron to move the carriage at various speeds, a follower supported independently of the apron, a leader carried by the apron engaged with the follower, and rotated by said multiple speed gearing to move the carriage at an additional number of speeds.

15. A thread cutting attachment for lathes comprising a housing having a cover plate and forming therewith a sleeve-like member, a pair of opposite movable slides surrounded on all sides by said housing and cover plate, the top part of one of said slides filling up the entire opening of the sleeve-like member.

16. In combination with a lathe having a bed, a traveling carriage with its apron and apron gearing, of a thread chasing attachment comprising a leader and a follower, one carried by the bed independently of the apron, and the other rotated by the apron gearing, and a control member movable with the apron for throwing said attachment into and out of operation.

In testimony whereof, I have hereunto affixed my signature.

GEORGE W. DRAKE.